US008571601B2

(12) United States Patent
Lim

(10) Patent No.: US 8,571,601 B2
(45) Date of Patent: Oct. 29, 2013

(54) SWITCHING COMMUNICATION RADIO PATH BASED ON POWER CONSTRAINTS

(75) Inventor: Miranda Bing Ying Lim, Nepean (CA)

(73) Assignee: BlackBerry Limited, Waterloo (CA)

(*) Notice: Subject to any disclaimer, the term of this patent is extended or adjusted under 35 U.S.C. 154(b) by 445 days.

(21) Appl. No.: 12/843,996

(22) Filed: Jul. 27, 2010

(65) Prior Publication Data

US 2012/0028670 A1   Feb. 2, 2012

(51) Int. Cl.
*H04M 1/00* (2006.01)
*H04B 1/38* (2006.01)
*H04B 1/16* (2006.01)

(52) U.S. Cl.
USPC ............. 455/552.1; 455/574; 455/343.5

(58) Field of Classification Search
USPC .......... 455/436, 437, 500, 524, 525, 550.1, 455/552.1, 574, 127.5, 343.1, 343.5; 370/311, 331
See application file for complete search history.

(56) References Cited

U.S. PATENT DOCUMENTS

| | | | |
|---|---|---|---|
| 2004/0102228 A1* | 5/2004 | Hakamata et al. | 455/572 |
| 2005/0239443 A1* | 10/2005 | Watanabe et al. | 455/414.1 |
| 2006/0135143 A1* | 6/2006 | Suematsu | 455/418 |
| 2006/0223465 A1* | 10/2006 | Akiba et al. | 455/127.4 |
| 2007/0129045 A1* | 6/2007 | Aerrabotu | 455/343.5 |
| 2008/0119199 A1* | 5/2008 | Hamano et al. | 455/455 |
| 2008/0279152 A1* | 11/2008 | Kim et al. | 370/331 |
| 2008/0287080 A1* | 11/2008 | Camp et al. | 455/127.5 |
| 2009/0286578 A1* | 11/2009 | Nagasawa et al. | 455/574 |
| 2010/0113088 A1* | 5/2010 | Erceg et al. | 455/552.1 |
| 2010/0124928 A1* | 5/2010 | Ergen et al. | 455/436 |
| 2010/0233989 A1* | 9/2010 | Constien et al. | 455/343.1 |
| 2010/0248646 A1* | 9/2010 | Yamazaki et al. | 455/73 |
| 2011/0021190 A1* | 1/2011 | Gunaratnam et al. | 455/433 |

FOREIGN PATENT DOCUMENTS

| | | |
|---|---|---|
| EP | 1701572 A2 | 9/2006 |
| EP | 1708369 A1 | 10/2006 |
| JP | 2009-049875 * | 3/2009 |

OTHER PUBLICATIONS

Extended European Search Report mailed Dec. 9, 2010. In corresponding application No. 10170952.5.

Ioannis Modeas et al. An Algorithm for Radio Resources Management in Integrated Cellular/WLAN Networks, IEEE International symposium on personal indoor and mobile radio communications PIMRC, IEEE; PI, XX Sep. 1, 2007, pp. 1-5, XP031168809 ISBN:978-1-4244-1143-6. I. Introduction; II Algorithm running in the mobile terminal. figures 1,2.

(Continued)

*Primary Examiner* — Nguyen Vo

(74) *Attorney, Agent, or Firm* — Novak Druce Connolly Bove + Quigg LLP

(57) ABSTRACT

Aspects relate to determining whether a constraint or other condition on a mobile device may be alleviated or better satisfied by switching from one communication network to another for a call (or setting up a call on one network in preference to another). A mobile device is operable to conduct a communication session over at least two different communication media, which have different power consumption characteristics. Where a remaining battery power level is constrained, a determination can be made whether using one network over another saves more than a threshold amount of power over another network. Estimates of battery life for each network can be made based on predictions of a length of the communication session, and a power factor calculated for the network.

18 Claims, 5 Drawing Sheets

(56) References Cited

OTHER PUBLICATIONS

Joe I et al. A network selection algorithm considering power consumption in hybrid wireless networks, IEICE Transactions on Communications, Communications society, Tokyo, JP LNKDD0I:10.1093/IETCOM/E91-B.1.314, vol. E91B, No. 1, Jan. 1, 2008, pp. 314-317, XP001510262 ISSN: 0916-8516.1 . Introduction 2. Network Selection Algorithm considering power consumption, 3. Power consumption prediction algorithm, 4. Final Network Selection Algorithm tables 1-6; figures 1,3.
EURASIP Journal on Wireless Communications and Networking vol. 2008 (2008), Article ID 791691, 12 pages doi:10.1155/2008/791691.

* cited by examiner

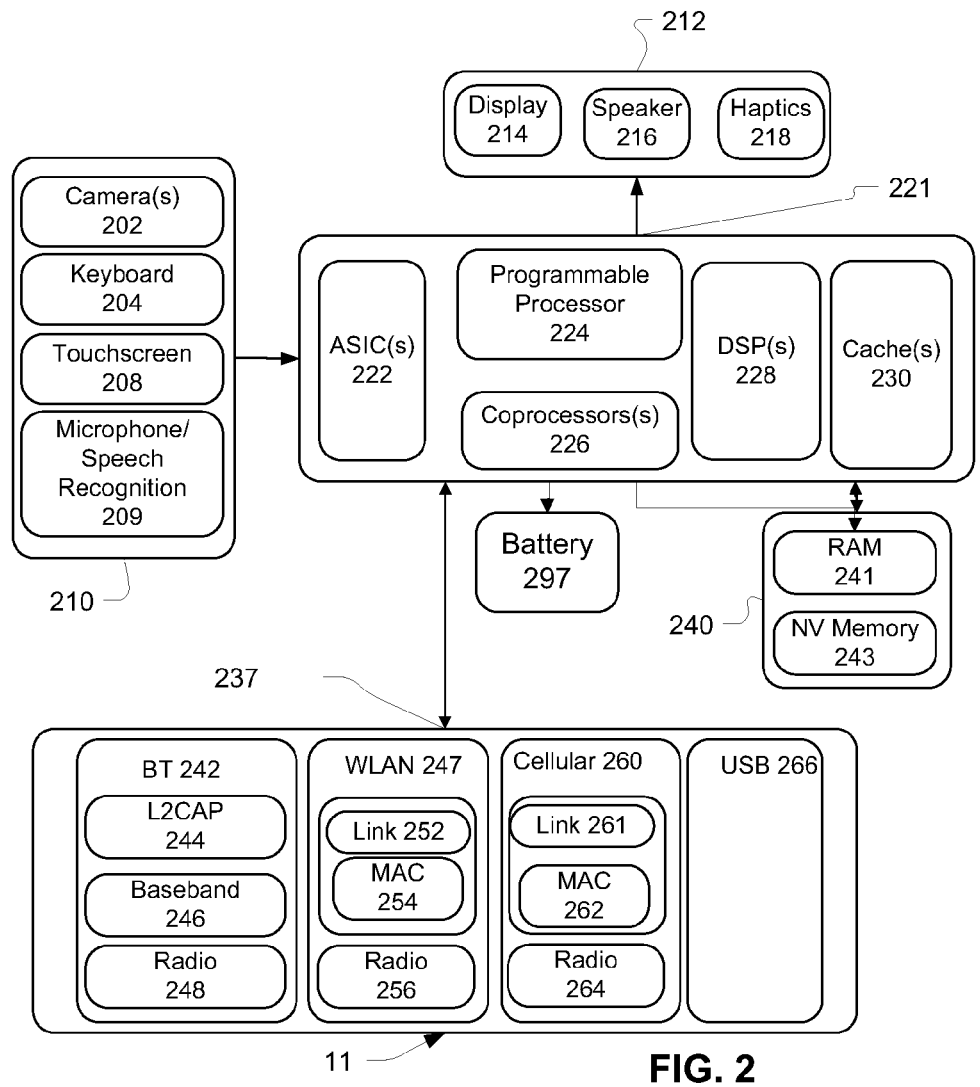
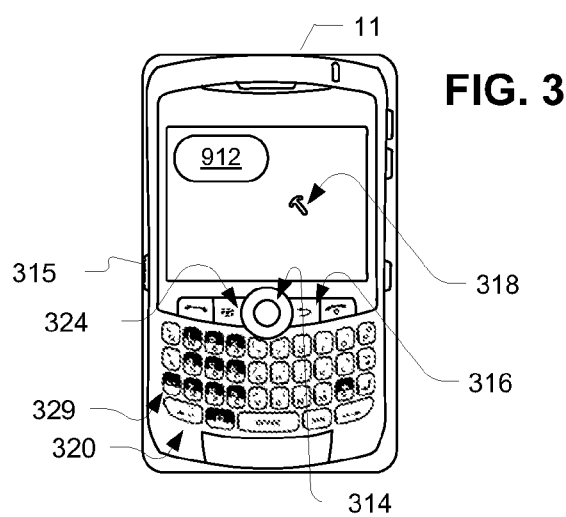

SWITCHING COMMUNICATION RADIO PATH BASED ON POWER CONSTRAINTS

BACKGROUND

1. Field:

The present application relates to mobile device communications, such as voice and data communication.

2. Related Art:

Mobile devices are used for voice and data communications. Some mobile devices can access multiple kinds of networks, such as a cellular network that can support one or more kinds of network operating standards, such as GSM, GPRS, EDGE, eVDOi, DO, CDMA, LTE, WiMAX, and so on. Increasingly mobile devices also may be able to use wireless local area network technologies, such as those standardized under IEEE 802.11. Improving capabilities and a user experience with such devices remains important.

BRIEF DESCRIPTION OF THE DRAWINGS

Reference will now be made, by way of example, to the accompanying drawings which show example embodiments of the present application, and in which:

FIG. 2 depicts example of components of an example mobile device;

FIG. 3 depicts an example form factor of a mobile device;

DESCRIPTION

Figure 1:
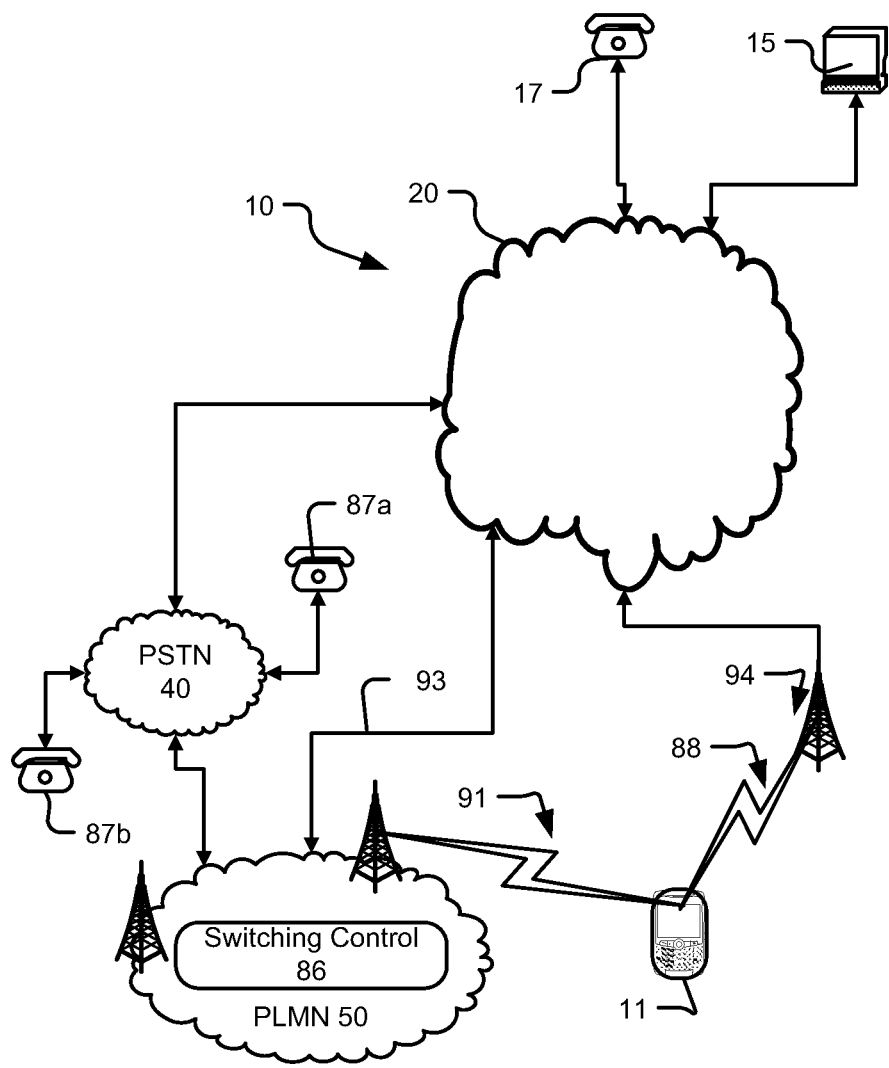
FIG. 1 shows, in block diagram form, an example system for managing enterprise-related mobile calls, including an enterprise communications platform.

Mobile devices are increasingly used for communication, such as voice calling and data exchange. Also, mobile devices increasingly can use a wider variety of network for such communication. For example, a mobile device can have a broadband cellular radio and a local area wireless network radio. Additionally, the broadband cellular capability of a mobile device may itself support a variety of standards, or protocols that have different communication capabilities, such as GSM, GPRS, EDGE and LTE.

While data exchange or a call is occurring, conditions on the mobile device may also be evolving. For example, a battery or other limited source of power for the mobile device may be draining, and network and radio conditions also may be changing. Improvements can be made in how a mobile device uses its radio resources for communication, while handling other constraints.

For example, in order to establish a new call from a mobile device (or to receive a new call), a mobile device can determine conditions on two or more networks (e.g., Networks A and B). Based on one or more criteria, the mobile device also can estimate a length of the call, and power factors for each network. With such information, the mobile device can estimate an amount of power required to perform the call on each of Network A and Network B. A current battery status can be checked, and if the battery status indicates that the available power remaining may be inadequate to complete the call on one of the networks (e.g., Network A), then the mobile device can recommend Network B, or cause the call to be initiated over Network B, if Network B would result in at least a threshold amount lower power consumption. Such network selection can be made even though a network condition on Network A may be expected to yield a better call experience, or be less expensive.

In another example, a call can be ongoing on a given network, e.g., Network A, and based on battery status measurements, the mobile device can estimate that only a certain number of minutes or amount of data can be communicated before a power threshold is reached. The mobile device can cause the call to be handed over to Network B, if an expected power consumption on Network B is less than on Network A by at least a threshold.

Information about call duration can be maintained to assist in determining whether to switch to or begin a call on a given network. For example, average call duration to a particular number or destination can be tracked, calendar information about a call can be accessed, and statistics can be kept for categories of calls. Such call duration information can be used as an input in determining how much power may be saved if using one network instead of another network, for a particular data communication session.

The mobile device can be configured to present an option to select from along two or more available networks, or to switch automatically, or to initiate a call automatically based on outputs of the method aspects described above.

Reference is now made to FIG. 1, which shows, in block diagram form, an example system arrangement 10, for explaining aspects according to this disclosure in more detail. FIG. 1 depicts that arrangement 10 includes a network 20, which can be comprised of one or more internets and other networks, and can include, for example, a corporate intranet, as well as components of public networks, such as components of the Internet. FIG. 1 depicts that communication devices, such as a telephone 17 and a computer 15 can be coupled to communicate using network 20. PSTN 40 also is depicted as being in communication with network 20. Two PSTN telephones 87a and 87b are depicted as being reachable over the PSTN. a Public Land Mobile Network (PLMN) 50 also is depicted, and includes a switching control 86. PLMN 50 is coupled to PSTN 40, and to network 20, through a data communication path 93. Data communication path 93 can include one or more packet networks, or linkages between packet networks. Separate identification of network 20 and path 93 is at least partially a matter of convenience, in that path 93 also in many circumstances could be considered part of network 20. One operative distinction being that PSTN 40 operates over circuit-switched lines, while communication path 93, and network 20 can include a wide variety of digital communication technologies, including packet switching technologies and protocols. For example, Internet Protocol (IP) addressing, and Session Initiation Protocol (SIP) can be used for establishing and conducting voice communications carried over path 93 and network 20.

A mobile device 11 is depicted as communicating with PLMN 50 using cellular communication 91. Cellular communication 91 can itself be implemented using a wide variety of technologies, and can also include voice and data network components (e.g., a voice channel and a data channel time, frequency, or code division multiplexed, according to any of a variety of implemented or proposed cellular communication approaches). Mobile device 11 also can communicate using wireless Local Area Network (LAN) technologies 88, such as those according to the IEEE 802.11 series of standards and proposals. Communication using such WLAN technologies 88 can occur between mobile device 11 and a base station 94, which in turn is coupled with network 20.

FIG. 2 depicts example components that can be used in implementing mobile device 11 according to the above description. FIG. 2 depicts that a processing module 221 may be composed of a plurality of different processing elements, including one or more ASICs 222, a programmable processor 224, one or more co-processors 226, which each can be fixed function, reconfigurable or programmable, one or more digital signal processors 228. For example, an ASIC or co-processor 222 may be provided for implementing graphics functionality, encryption and decryption, audio filtering, and other such functions that often involve many repetitive, math-intensive steps. Processing module 221 can comprise memory to be used during processing, such as one or more cache memories 230.

Processing module 221 communicates with mass storage 240, which can be composed of a Random Access Memory 241 and of non-volatile memory 243. Non-volatile memory 243 can be implemented with one or more of Flash memory, PROM, EPROM, and so on. Non-volatile memory 243 can be implemented as flash memory, ferromagnetic, phase-change memory, and other non-volatile memory technologies. Non-volatile memory 243 also can store programs, device state, various user information, one or more operating systems, device configuration data, and other data that may need to be accessed persistently.

User input interface 210 can comprise a plurality of different sources of user input, such as a camera 202, a keyboard 204, a touchscreen 208, and a microphone, which can provide input to speech recognition functionality 209.

Processing module 221 also can use a variety of network communication protocols, grouped for description purposes here into a communication module 237, which can include a Bluetooth communication stack 242, which comprises a L2CAP layer 244, a baseband 246 and a radio 248. Communications module 237 also can comprise a Wireless Local Area Network (247) interface, which comprises a link layer 252 with a MAC 254, and a radio 256. Communications module 237 also can comprise a cellular broadband data network interface 260, which in turn comprises a link layer 261, with MAC 262. Cellular interface 260 also can comprise a radio for an appropriate frequency spectrum 264. Communications module 237 also can comprise a USB interface 266, to provide wired data communication capability. Other wireless and wired communication technologies also can be provided, and this description is exemplary.

Referring to FIG. 3, there is depicted an example of mobile device 11. Mobile device 11 comprises a display 312 and a cursor or view positioning device, here depicted as a trackball 314, which may serve as another input member and is both rotational to provide selection inputs and can also be pressed in a direction generally toward housing to provide another selection input. Trackball 314 permits multi-directional positioning of a selection cursor 318, such that the selection cursor 318 can be moved in an upward direction, in a downward direction and, if desired and/or permitted, in any diagonal direction. The trackball 314 is in this example situated on a front face (not separately numbered) of a housing 320, to enable a user to maneuver the trackball 314 while holding mobile device 11 in one hand. In other embodiments, a trackpad or other navigational control device can be implemented as well.

The mobile device 11 in FIG. 3 also comprises a programmable convenience button 315 to activate a selected application such as, for example, a calendar or calculator. Further, mobile device 11 can include an escape or cancel button 316, a menu or option button 324 and a keyboard 320. Menu or option button 324 loads a menu or list of options on display 312 when pressed. In this example, the escape or cancel button 316, menu option button 324, and keyboard 329 are disposed on the front face of the mobile device housing, while the convenience button 315 is disposed at the side of the housing. This button placement enables a user to operate these buttons while holding mobile device 11 in one hand. The keyboard 329 is, in this example, a standard QWERTY keyboard.

Figure 4:
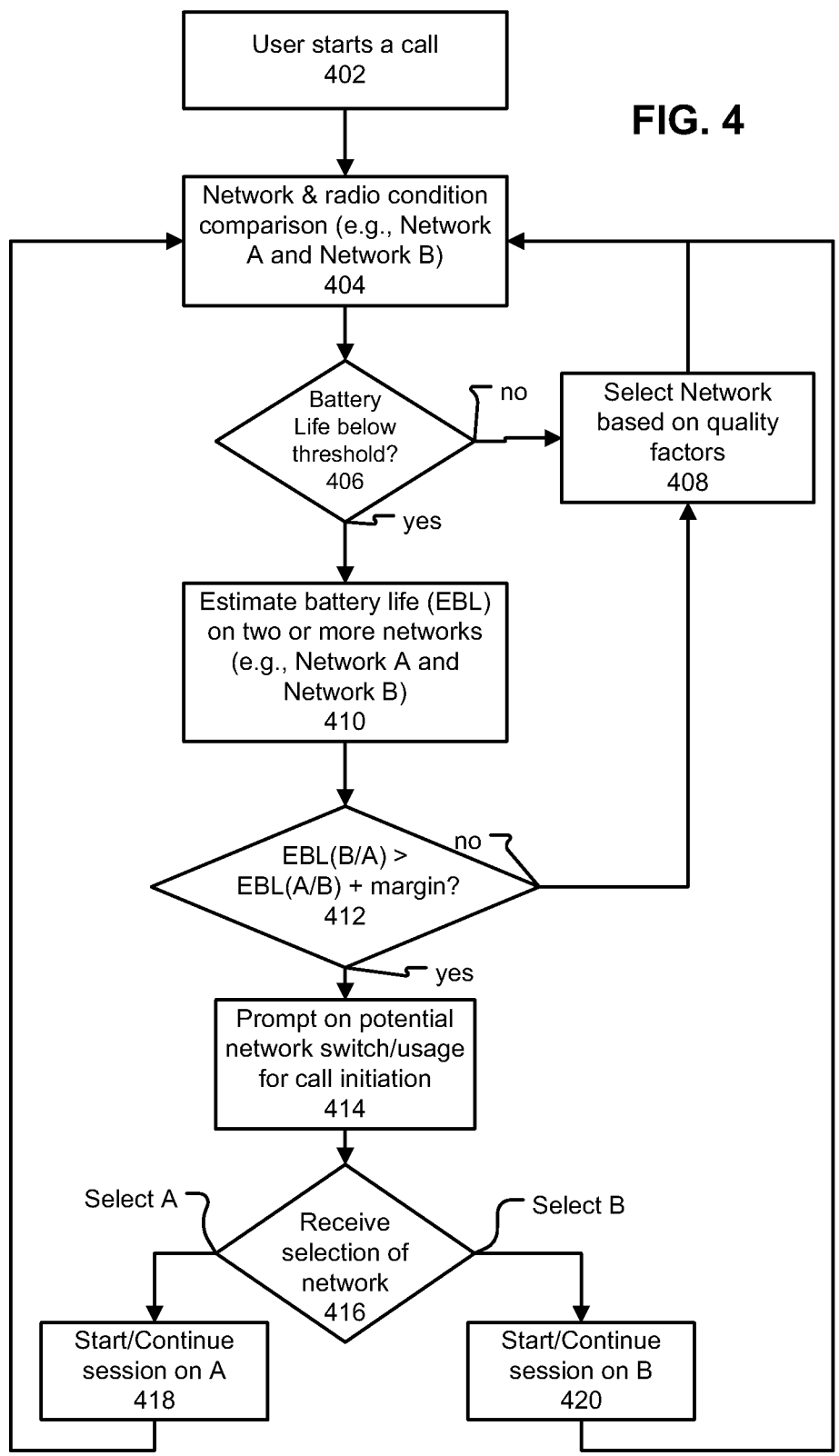
FIGS. 4 and 5 depict methods of selecting a network on which to establish a call, or to switch a call, based on power constraints, and estimates of power consumption/battery life of the mobile device, depending on network selection.

FIG. 4 depicts a first example method of selecting a communication network to use for a call involving a mobile device (or more generally a communication session), in which a status of a battery powering the mobile device can trigger elements of the depicted method, described below. The method of FIG. 4 exemplifies a situation where a new call is to begin, and a network for carrying the call is to be selected. Thus, a user can start a call (402), such as by opening an application, or otherwise interacting with an interface of mobile device to initiate the call. A comparison of conditions on a plurality of networks is conducted (404). For example, signal strength requirements to communicate with a base station of a wireless LAN, and a tower of a cellular communication system can be assessed. Congestions on the network also can be monitored. Variability in such parameters also can be assessed, which also can be relevant to call quality considerations.

An assessment of energy remaining in a battery (or more generally, any energy storage element or elements, such as a fuel cell) is made, and in particular, a determination (406) whether a remaining amount of energy ("battery life") is below a threshold. If battery life is not below a threshold, then in one example, the call can be conducted using the network that has the higher(est) call quality conditions (408). However, if the battery life is below a threshold (such that an estimated amount of energy remaining in the battery is less than a threshold), then estimates of battery life (EBL) can be formed (410) for two or more networks which could be used for the call, even though perhaps call quality may be less on, or toll charges more, on one or more of those networks (example of FIG. 4 is for two networks, network A and network B). In other words, EBLs can be produced that predict how long a battery would last, if a given communication path were used for the call to be setup.

These estimates also can be formed prior to determining that battery life is below a threshold (406), however if battery life is generally high, then these calculations may be unnecessary. Based on the EBLs calculated (410), a determination (412) can be made as to whether either network A or network B has an EBL greater than the other by at least a margin (or threshold) more than the other network. For example, the margin can be set at a percentage of the EBL of one or more of Network A and Network B. If one of the networks offers at least a marginally longer EBL, then the choice (or action) to use that network can be presented (or taken) (414). For example, a prompt on an interface can be presented indicating than battery life may be of concern, and that resource may be conserved by using a recommended network with a longer EBL. A selection responsive to such a prompt also can be received (416) through the interface. Responsive to the selection, the call can be started or continued on the selected network (e.g., if Network A is selected, the call can be started on Network A (418), or conversely for Network B (420)). For example, a user may select the network with the longer EBL for the call, under some circumstances, and not others. In other implementations, the mobile device can be configured to automatically select, or propose the longer EBL network as a default for the call. Thus, FIG. 4 presents a method in which a mobile device that can use a plurality of networks, accessed through a plurality of network interfaces, is operable to select from among the networks, in a constrained battery power situation, a network that would be expected to provide at least a margin better battery life than the other available networks. In particular, the requirement to have at least a margin longer expected battery life allows a better user experience, where the choice of networks is not proposed or implemented where one network may have only a small amount expected longer better battery life. As such, the margin should be set to greater than a small or insignificant amount, such as at least 10% of the total battery life, or 10% of the expected battery life of one or more of the networks. The margin (also can be called a threshold) can be configured based on particular characteristics of each mobile device, or based on particular criteria of a user of each mobile device.

The method can relate to any number of networks, even though only two are involved in this example. In this disclosure, one network interface can interface with multiple networks options; for example, a call can be carried on a cellular data channel as packets or a cellular voice channel, which involves one or more portions of the PSTN, or over a wireless LAN interface, or a Bluetooth link (or another personal area network type) to another transceiver. For these purposes, each combination of interface, and transport can be considered a different network, where such combination may provide a different expected battery life that can be considered in the decision whether to use that combination of interface and transport for a given call.

Figure 5:
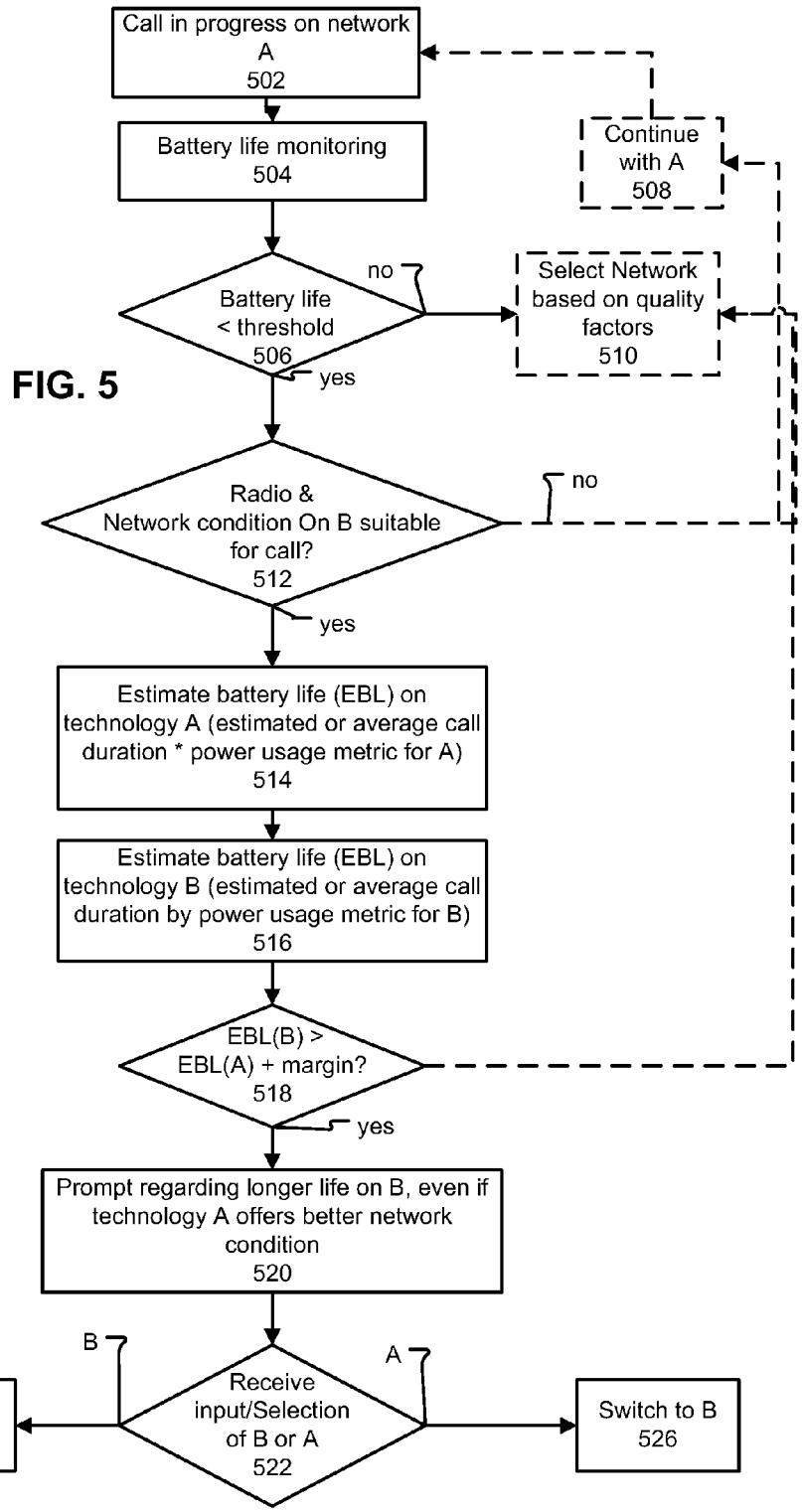

FIG. 4 principally concerned an example method of initiating a call (or communication session, generally). FIG. 5 depicts a method more focused on in-progress calls.

FIG. 5 depicts a method in which, for example, a call is in progress on network A (502). A battery status of the mobile device is monitored (504), and responsive to detecting a threshold condition in the monitored battery status (506), a determination (512) can be made as to whether one or more other networks can be used for the in-progress call (e.g., by checking whether radio and network conditions on Network B are suitable for the call). If there is at least one other network (e.g., network B) available (or capable) for the call, then expected battery life calculations for each of network A and network B can be conducted (514, 516). If the non-active network (network B in this example) provides at least a threshold (marginal) amount more expected battery life (518), then a prompt can be presented (520) on the interface to query whether the call should be transferred to network B. Upon receiving a response (522), the response is parsed to determine whether to switch to network B (526), or remain (524) on network A. Thus, FIG. 5 depicts that a choice to switch networks can be presented responsive to detecting a battery condition that may present a problem to complete a call in progress.

In implementations according to this disclosure, the threshold amount of battery life can be set based on an expected duration of a call, or a remaining expected duration of a call in progress. For example, the threshold can be set such that once the battery life gets to a point where the expected duration of the call may not be serviceable on the current or default network, then a choice to select or switch to a different network can be presented, qualified by the further determination that the different network presents at least a significant margin better expected battery life, such as 10% or more better expected battery life.

Figure 6:
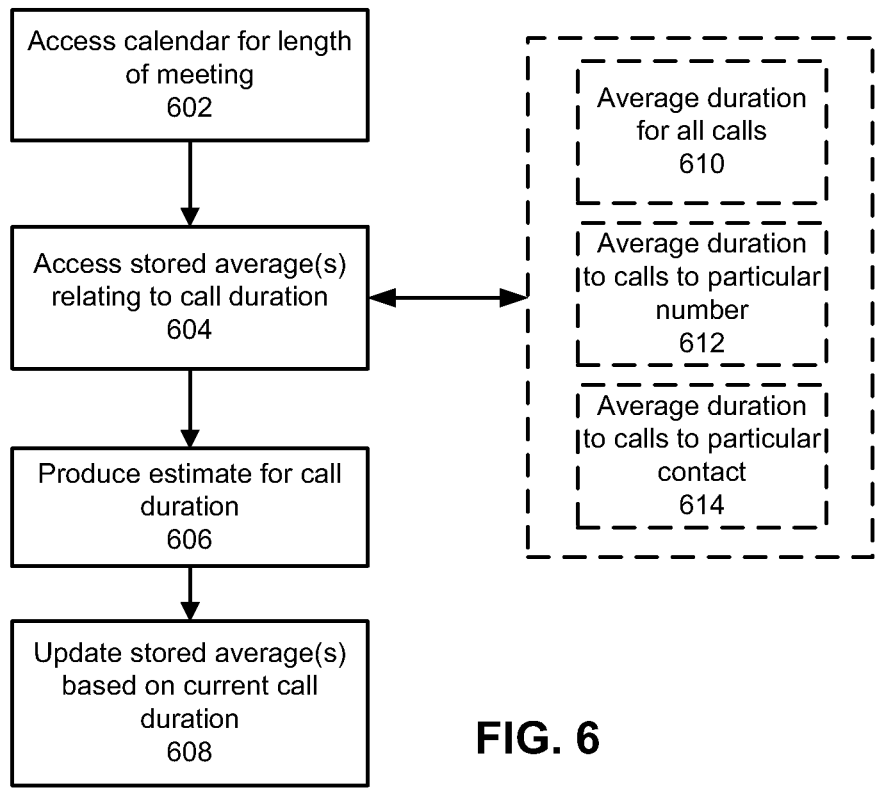
FIGS. 6 and 7 depict examples of methods that can be used in obtaining data for determining estimates of battery life using different networks for a given communication session, of a predicted duration.
Figure 7:
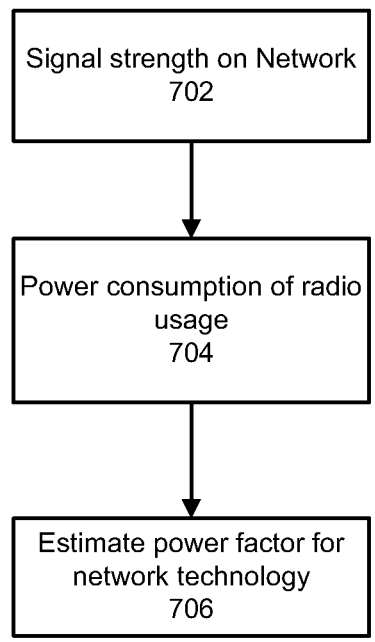

In order to determine expected call durations, which can be used in setting the threshold to determine battery level conditions, as well as expected battery life calculations, call history information can be preserved. FIGS. 6 and 7 depict example approaches to obtaining and producing information that can be used in methods according to the examples of FIGS. 4 and 5.

FIG. 6 depicts an example where a calendar storing information about a call in progress or to be initiated can be accessed (602) to determine whether there is a set duration. For example, the calendar may indicate that the call is set for an hour duration, less or more. Further, information about previous calls, such as calls to the particular number, calls for the particular meeting or event, or a weighted average of some subset of calls serviced by the mobile device can be accessed (604). For example, the call to be initiated can be a regular call, and over some time, the mobile device can develop statistics about how long the call generally lasts. These approaches are depicted by stored averages for all calls (610), average duration of calls to a particular number (612), or average duration of calls to a particular contact (614), which may or may not be on the same number. Such approaches provide examples of how an estimate of call duration can be produced (606). Stored averages or raw data to compute such averages can be updated for each call conducted using mobile device 11 (608).

In conjunction with an estimated call duration, a power factor for each network can be used in determining the EBL for that network. FIG. 7 depicts an example, where the power factor can be estimated by determining a signal strength on the network (702), since signal strength may indicate how much transmit power would be expected. Metrics concerning the overall power consumption of the radio for the network also can be accessed (704), as well as other information, such that a power factor can be produced (706).

In the foregoing, separate boxes or illustrated separation of functional elements of illustrated systems does not necessarily require physical separation of such functions, as communications between such elements can occur by way of messaging, function calls, shared memory space, and so on, without any such physical separation. As such, functions need not be implemented in physically or logically separated platforms, although they are illustrated separately for ease of explanation herein.

For example, different embodiments of devices can provide some functions in an operating system installation that are provided at an application layer or in a middle layer in other devices. Different devices can have different designs, such that while some devices implement some functions in fixed function hardware, other devices can implement such functions in a programmable processor with code obtained from a computer readable medium.

Further, some aspects may be disclosed with respect to only certain examples. However, such disclosures are not to be implied as requiring that such aspects be used only in embodiments according to such examples.

The above description occasionally describes relative timing of events, signals, actions, and the like as occurring "when" another event, signal, action, or the like happens. Such description is not to be construed as requiring a concurrency or any absolute timing, unless otherwise indicated.

Certain adaptations and modifications of the described embodiments can be made. Aspects that can be applied to various embodiments may have been described with respect to only a portion of those embodiments, for sake of clarity. However, it is to be understood that these aspects can be provided in or applied to other embodiments as well. Therefore, the above discussed embodiments are considered to be illustrative and not restrictive.

What is claimed is:

1. A method of operating a communication device, comprising:
   determining operational conditions for a first communication network and a second communication network, which the communication device is operable to use for communicating;
   determining a condition of an energy storage element for powering the device;
   determining a threshold based on an expected amount of energy to complete a new communication session or an ongoing communication session;
   responsive to the current condition of the energy storage element being below the threshold;
   determining, for a communication session, whether an expected energy consumption for using the first communication network is less than using the second communication network by at least a threshold, and responsively providing an indication on an interface of the device, the indication prompting a selection of an active communication network, between either the first communication network or the second communication network; and
   if the selected communication network is not currently active, then switching to the selected communication network for the communication session.

2. The method of claim 1, wherein the communication session is currently being conducted.

3. The method of claim 1, wherein the communication session is to be initiated, and neither the first communication network nor the second communication network currently is active.

4. The method of claim 1, further comprising determining the expected energy consumption for each of the first communication network and the second communication network based on a predicted length of the communication session.

5. The method of claim 1, further comprising determining the expected energy consumption for each of the first communication network and the second communication network based on an average length of previous communication sessions.

6. The method of claim 1, further comprising determining the expected energy consumption for each of the first communication network and the second communication network based on prior communication session characteristics.

7. The method of claim 1, further comprising determining the expected energy consumption for each of the first communication network and the second communication network based on respective power consumption factors.

8. A method of operating a communication device capable of using a plurality of communication networks, comprising:
   determining a current condition of an energy storage element powering the device;
   determining a threshold of remaining energy based on an expected amount of energy required to complete a new communication session or an ongoing communication session;
   responsive to the current condition of the energy storage element being below the threshold of remaining energy, determining whether at least one of the plurality of communication networks is available for use and is expected to require at least a threshold amount less energy to use during a communication session than another communication network of the plurality;
   indicating availability of the lower-energy consumption communication network; and
   accepting an indication whether to use the lower-energy consumption communication network for the communication session.

9. The method of claim 8, wherein the indicating is performed by providing an indication on an interface of the communication device, and the accepting of the selection is performed by accepting a selection through the interface.

10. The method of claim 8, wherein the plurality of communication networks comprise a wireless local area network and a cellular access network.

11. The method of claim 8, wherein the indication is provided from a configuration storage indicating a preference whether to use the lower-energy consumption communication network.

12. A mobile device, comprising:
    a plurality of interfaces to communication networks; and
    a processor programmed to select, for a communication session, an active communication network interface from among the plurality of communication network interfaces by detecting a threshold condition in an energy storage element for powering the mobile device, responsive to detecting the threshold condition, determining a threshold amount of energy based on an expected amount of energy to complete a new communication session or an ongoing communication session, responsive to the current condition of the energy storage element being below the threshold of remaining energy; determining whether usage of one of the communication networks for the communication session would save at least a threshold amount of energy if used, and responsively selecting the interface to that communication network for the communication session.

13. The mobile device of claim 12, wherein interfaces comprise an interface to a local wireless network and an interface to a cellular communication network.

14. The mobile device of claim 12, wherein the processor is further programmed to calculate the threshold condition for the energy storage element based on an expected amount of power to be consumed in the communication session for at least two of the plurality of communication networks.

15. The mobile device of claim 12, wherein the processor is programmed to determine an expected amount of power consumed during the communication session using a power factor for each of the plurality of communication networks, and to compare an estimate of the expected amount of energy consumed in the communication session using each of the communication networks to an estimated amount of energy remaining in the energy storage element.

16. A non-transitory computer readable medium storing a program comprising executable code for controlling a communication device to perform a method, comprising:
    determining a current condition of an energy storage element powering the device;
    determining a threshold of remaining energy based on an expected amount of energy to complete a new communication session or an ongoing communication session;
    responsive to the current condition of the energy storage element being below the threshold of remaining energy, determining whether at least one of a plurality of communication networks is available for use and would save at least a threshold amount of energy, compared with another of the communication networks during a communication session;
    indicating availability of a lower-power consumption communication network; and accepting a selection whether to use the available lower power consumption communication network or not.

17. The non-transitory computer readable medium of claim 16, wherein the indicating is performed by providing an indication on an interface of the mobile device, and the accepting of the selection is performed by accepting a selection through the interface.

18. The non-transitory computer readable medium of claim 16, wherein the plurality of communication networks comprise a wireless local area network and a cellular access network.

\* \* \* \* \*

UNITED STATES PATENT AND TRADEMARK OFFICE
CERTIFICATE OF CORRECTION

Page 1 of 1

PATENT NO.         : 8,571,601 B2
APPLICATION NO.    : 12/843996
DATED              : October 29, 2013
INVENTOR(S)        : Miranda Bing Ying Lim It is certified that error appears in the above-identified patent and that said Letters Patent is hereby corrected as shown below:

In the Specification

Column 1, line 14 reads, "GPRS, EDGE, eVDOi, DO, CDMA, LTE, WiMAX, and so"
should read
-- GPRS, EDGE, eVDO, DO, CDMA, LTE, WiMAX, and so --.

Column 2, line 41 reads, "reachable over the PSTN. a Public Land Mobile Network (PLMN)"
should read
-- reachable over the PSTN. A Public Land Mobile Network (PLMN) --.

Signed and Sealed this
Twenty-first Day of October, 2014

Michelle K. Lee
*Deputy Director of the United States Patent and Trademark Office*